FIG. 1

INVENTOR.
WERNER R. TREMPLER
BY W. F. Patrick
ATTORNEY

Dec. 10, 1963  W. R. TREMPLER  3,113,594
CONTROL VALVE
Filed June 28, 1961  5 Sheets-Sheet 2

INVENTOR.
WERNER R. TREMPLER
BY *W. N. Patrick*
ATTORNEY

Dec. 10, 1963   W. R. TREMPLER   3,113,594
CONTROL VALVE

Filed June 28, 1961   5 Sheets-Sheet 4

INVENTOR.
WERNER R. TREMPLER
BY *W. N. Patrick*
ATTORNEY

Dec. 10, 1963   W. R. TREMPLER   3,113,594
CONTROL VALVE
Filed June 28, 1961   5 Sheets-Sheet 5

INVENTOR.
WERNER R. TREMPLER
BY *W. N. Patrick*
ATTORNEY

United States Patent Office 3,113,594
Patented Dec. 10, 1963

3,113,594
CONTROL VALVE
Werner R. Trempler, Grand Rapids, Mich., assignor to Lear Siegler, Inc., Santa Monica, Calif., a corporation of Delaware
Filed June 28, 1961, Ser. No. 120,255
13 Claims. (Cl. 138—46)

This invention relates to a control valve. More particularly, this invention relates to a damping control valve for a moving body in a fluid system.

Scientific instruments containing a liquid in the instrument housing require damping of any moving indicating parts in order to perform satisfactorily. Various liquid damping systems have been developed for such instruments in the past. A problem encountered in fluid damping is that the viscosity of fluids, such as silicone oils, varies with changes in temperature. Therefore, in order to provide a system having a constant damping force over a wide temperature range, it is required to develop a novel control valve.

An example of control of damping in a rate of turn gyro to a constant value over the temperature range of approximately −54° C. to 100° C. constitutes a necessity where the rate of turn gyro is part of an automatic, semi-automatic, manual or programmed flight control system or display system, in today's fast-flying aircraft, missiles or drones. This damping control assures constant time response of the signal supplied by the instrument to changes in flight attitude or direction so that control surfaces of the flying craft will respond to these command signals of the rate gyro within the same time element irrespective of the temperature to which the craft is subjected.

The most effective fluid damping (conversion of kinetic energy into heat) is when a pressure differential exists between opposite sides of the damper. Example:

A piston moving up and down in a cylinder between piston O.D. and cylinder I.D. The damping then is a function of:

$$\frac{(\text{Diameter of Piston})^3}{(\text{Diametrical Clearance})}$$

The damping means where no pressure differential exists, such as two surfaces moving with respect to each other at a certain spacing, is a function of area of the smaller surface and clearance between them in a linear relationship. This damping means is the object of this invention.

It is, therefore, an object of this invention to provide a novel fluid control valve. Another object of this invention is to provide a damping system for instruments having a high degree of compensation over a wide temperature range. It is also an object of this invention to provide a damping system having high damping values with relatively small effective damper area which permits the use of low viscosity oils. Another object of this invention is to provide a damping system which reduces the inherent damping characteristics of the instrument to a minimum. Still another object is to provide a damping system which is relatively easy to manufacture and assemble. Still other objects of this invention will be apparent from the discussion which follows.

The above and other objects of this invention are accomplished by a valve orifice control mechanism comprising (1) an orifice controlling first means containing at least one first passage therethrough, (2) an orifice controlling second means having at least one second passage therethrough with a peripheral boundary having contour which is different from the contour of the boundary of the first passage, wherein the controlling second means is positioned in sliding relationship to the first means and wherein said first passage and said second passage cooperate to form an orifice, (3) a thermal responsive means associated with the first and second means so as to slidably displace the first means relative to the second means to thereby vary the alignment between the passages, and wherein the peripheral boundary of at least one of the first and second passages has a contour such that when the distance of displacement of the first means relative to the second means is substantially linear relative to change in temperature, the cross-section of the orifice varies in a predetermined non-linear manner.

The above-mentioned objects and features of this invention will be more readily understood from the following description taken in conjunction with the accompanying drawings, which are not drawn to scale, and in which.

Corresponding components in the various figures bear the same numeral.

Figure 1:
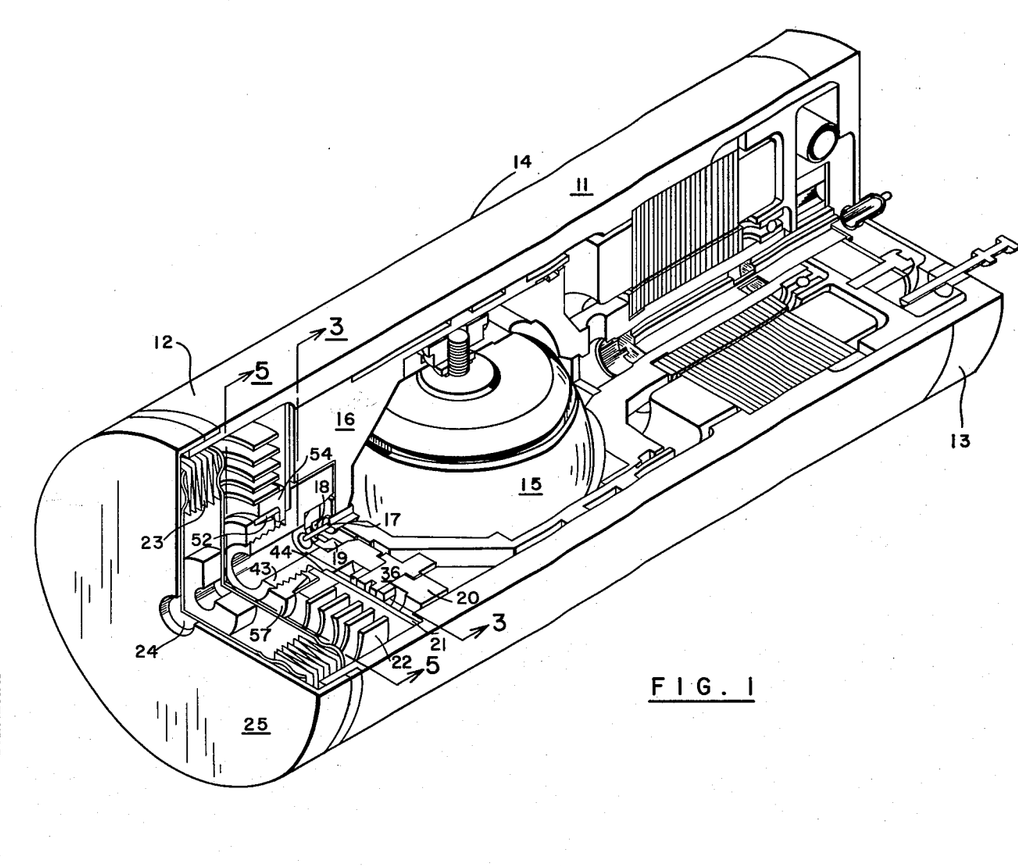
FIG. 1 is a cased rate gyro instrument shown partly in section.

In FIG. 1, the rate gyro instrument 11 comprises a casing 14 having a first end 12 and a second end 13. The gyro motor 15 is mounted in gimbal 16. A trunnion 17 is attached to one end of the gimbal and is rotatably mounted in jewel bearing 18 within bearing housing 19. The end plate 20, compensation means 21 together with spring 22 are more clearly shown in the exploded view given in FIG. 2. The expansion bellows 23 serve to compensate for oil volume change with temperature. The air vent hole 24 in end cover 25 permits the passage of air from the atmosphere to the space above the bellows.

Figure 2:
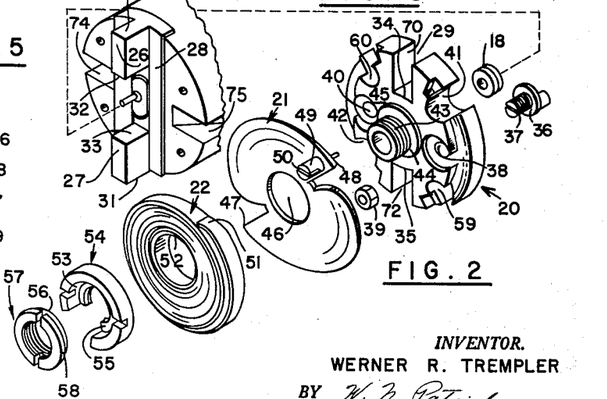
FIG. 2 is an exploded view of the components which provide damping for the rotating gimbal.

One-half 16, of a two-piece gimbal assembly is shown in FIG. 2. It serves as a mounting bracket for the spin motor 15. The paddles 26 and 27 are extensions of the end surface of 28 of the gimbal 16. The end surface 28 of the gimbal acts as a "bottom" for the chambers 29 and 72 in end plate 20 in which the paddles move. A close fit between the gimbal end surface 28 and the end plate 20 effectively seals the bottom of the chambers 29 and 72, substantially eliminating leakage without creating friction beyond the small amount of nonhysteresis-causing sheer damping which takes place between adjacent moving surfaces.

The space between the gimbal 16 and the casing 11 is filled with a damping fluid such as, for example, a silicone oil. The side surfaces 30 and 31 of the paddles 26 and 27 fit closely to the inner surface of the casing 11. In like manner, the inner side surfaces 32 and 33 of the paddles 26 and 27 fit closely to the inner side surfaces 34 and 35 of the chambers 29 and 72 in end plate 20. The sides 80 and 81 form with the sides 82 and 83 of the chamber 72 (FIG. 6) two separate chambers between which the damping fluid flows. In effect the ends of these chambers form first and second passages 84 and 85, respectively, which communicate together through a third passage formed by the contoured opening 63. As will be subsequently described in detail, the relative positions of contoured opening 63 with the passages 84 and 85 (see FIG. 5) controls the flow of damping fluid and consequently the damping effect. It should be understood that identical passages are formed in chamber 29. A gimbal stop 36 having threaded bolt section 37 adapted to pass through hole 38, is held in place by means of nut 39 which engages the threaded bolt section. In like manner, another gimbal stop member, not shown, is mounted in hole 40. Scalloped recesses 41, 42, 59 and 60 form clearance holes for access to the gimbal balance screws (not shown). The end plate 20 has an axial threaded flange means 43 extending axially from a collar 44 on the surface 45 of the end plate which is further removed from the gimbal 16.

The damping compensation disc means 21 has an axial opening 46 sufficiently large to accommodate the collar 44, so as to enable the compensating means to be mounted in rotatably sliding relationship adjacent the surface 45 of the end plate 20. The plate or disc-like compensator means 21 has one or more contoured notches, serrations, or cut-out sections along its periphery, as at 47 and 48. These contoured cut-out sections form contoured openings 62 and 63 each of which is a part of separate orifice controlling means for controlling the flow of damping fluid from one side to the other of the paddles 26 and 27, respectively. A spring retainer stud 49 is fixedly mounted on the surface of the compensator disc. The spring retainer stud 49 has a slot 50 adapted to receive the end 51 of spring 22. When the components of FIG. 2 are in assembled form, the inner end 52 of the spring 22 rests along the inner surface 53 of the sectional collar means 54 which has a radially inward extending flange 55 at its base. The tapered neck 56 of the retaining nut 57 is adapted to extend through the collar means 54, and through spring 22 to engage the externally threaded flange means 43 on the end plate or member 20. The tapered neck 56 of the retaining nut 57 serves as a wedge to hold the end 52 of the spring 22 between the tapered neck 56 and the inner surface of the collar means 54 (see FIG. 1). The base of the collar means 54, with the aid of flange 58 of the retaining nut 57, retains the compensator disc means 21 in place about the collar 44 when the retaining nut 57 is in threaded engagement with the axially extending flange 43.

Figure 3:
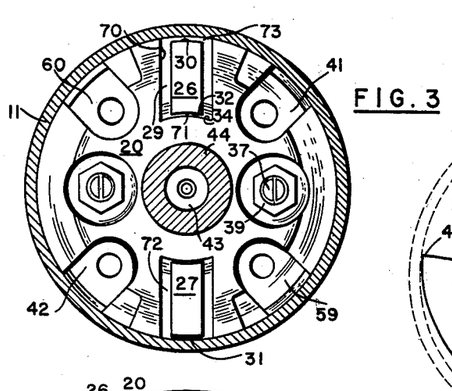
FIG. 3 is an end view taken along plane 3—3 of FIG. 1.

FIG. 3 shows a view of the end plate 20 with the gimbal component 16 beneath it. The paddles 26 and 27 of the gimbals are shown in chambers 29 and 72 in the end plate.

Figure 4:
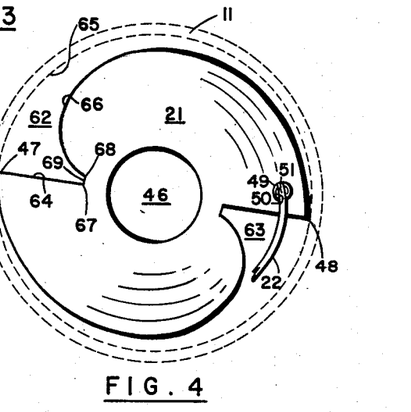
FIG. 4 is an end view of a damping compensation member.

FIG. 4 shows an axial or end view of the compensator disc 21 with the casing 11 shown in broken lines. A section of spring 22 is shown with an end 51 thereof fixed in slot 50 of the spring retaining member 49. The spring is fixedly mounted in the slot by suitable means such as by soldering, welding, screw means, etc. The disc has one or more contoured cut-out sections or notches in the peripheral edge such as those designated by reference numerals 47 and 48. The contoured boundary of the cut-out sections together with the inner surface of the casing 11 adjacent thereto cooperate to define a contoured passage or opening through the compensator disc member. It will be seen from FIG. 4 that the passages or openings 62 and 63 have an elongated, contoured cross-sectional area which approximates the area under the damping fluid viscosity-temperature curve between two predetermined points when shown in a polar coordinate graph. The cross-sectional area by reason of its contour approximates the shape of a sickle blade. The elongated area 62 can be described as being enclosed by a peripheral boundary line having a first base section 64. In this case, the base section is a line traced by a point moving along a portion of a radial line extending from the axis of said disc to the periphery thereof. In FIG. 4, the base section 64 is traced by a point moving along a radial line of said disc beginning at a point intermediate the axis and the outer peripheral edge and extending to the edge of said disc. A second curved section 65 of the boundary of the passage 62 originates at a point, on the inner surface of the casing 11, which is substantially adjacent the point 47 on one end of the straight line boundary section 64 and is represented by a line traced by a point moving along a path having fixed distance from the fixed axis of rotation of the disc. A third boundary section is represented by the contoured line beginning at the other extremity of the straight line section 64. At least a part of the third boundary section is a line traced by a second point moving along a path having a variable distance from the fixed axis of rotation of the disc. Stating this in another manner, at least a portion of the contoured third boundary section 66 is formed by a moving point, the distance of which from the axis of the disc varies along a fixed radial line in a two-dimensional space, while the disc is caused to rotate. The other extremity of the contoured boundary section 66 contacts or comes adjacent to the boundary section 65 to thus completely enclose the passage or area 62. In FIG. 4, contoured boundary line 66 is shown to contact the boundary line 65 at point 48. This is not intended to be limiting since the curve 65 can be contacted by the boundary section 66 at a point intermediate the points 47 and 48. In FIG. 4, the section 66 is formed in part by a point which progressively moves in a radially outward direction from point 68 along a straight line course while the disc 21 is concurrently being rotated in a counterclockwise direction, until the point reaches the outer peripheral edge of the disc where it contacts the line formed by the inner surface 65 of the casing 11. Passageway 63 is formed in the same manner. The boundary section 69 between the terminus 67 of the base section 64 and the initiation point 68 of the curved portion of the boundary section 66 is actually a continuation of the section 66. In other embodiments of this invention, section 69 is nonexistent and point 68 coincides with point 67. Section 69 can be a straight line or a curved line and can be a line traced by a point moving at a fixed distance from the axis of the disc 21, or it can be a line traced by a point whose radial distance from the axis of the disc varies along a fixed radial line as the disc is caused to rotate about its axis.

Figure 5:
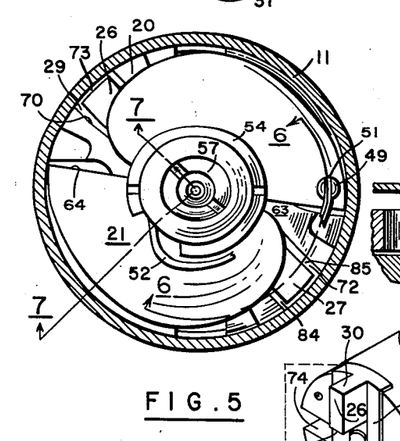
FIG. 5 is a view similar to that shown in FIG. 3 but with the damping compensation member of FIG. 4 mounted in place.

FIG. 5 is an axial view taken along the plane 5—5 of FIG. 1, but with only parts of the spring 22 shown. The end 52 of the spring 22 is so mounted on the flange 43 of the end plate 20, that at a predetermined temperature, the base section 64 of the passage or opening 62 in the disc 21 is aligned with the sidewall 70 of the chamber 29. This aligned position is not shown in the drawing. When so aligned, the maximum cross-sectional area of the chamber 29 is visible through the passage 62. The same would hold true for opening 63 and chamber 72. As the temperature increases, the temperature-responsive spring or member 22 expands, causing the disc 21 to rotate in a counterclockwise direction relative to the end plate 20. As this revolution takes place, the contoured shape of the curved section 66 of the boundary line defining the opening of passage 62 causes a part of the chamber 29 to be covered over so that a smaller cross-sectional area of the chamber 29 coincides with a portion of passageway or opening 62. Thus as higher temperatures, when the viscosity of any given fluid is decreased, the damping fluid which surrounds the rotatable gimbal and is present in the chamber 29, will have a smaller cross-sectional area available for escaping from the chamber upon movement of the paddle 26 from one side of the chamber to the other. Hence, the combination of an elongated passage in the rotating disc and the opening of chamber 29 serves as a passage control means which provides substantially stabilized damping regardless of change in temperature and the accompanying changes in viscosity of the damping fluid. It is readily seen that the curvature of the contoured section 66 could be such that at predetermined increased temperatures a greater cross-sectional area of the chamber 70 would be exposed to the passageway or opening 62 so that the damping could be programmed to vary in a predetermined manner with varying temperature. The discussion with respect to chamber 29 and opening 62 also holds for chambers 72 and opening 63.

At higher temperatures, only a relatively small cross-section of the chamber 29 is exposed to the opening 62. When the paddle 26 moves, in a counterclockwise direction say, the fluid, such as a silicon oil, leaves the chamber on one side of the paddle 26. However, it cannot leave at any faster rate than the fluid can enter the chamber on the other side of the paddle 26. If the chamber on one side of the paddle is completely closed off by the disc 21 the determining factor for damping is established by the rate that the fluid can pass through the gap 71 between the end 32 of the paddle 26 and the inner side surface 34 of chamber 29 and also the gap 73 between the end 30 of paddle 26 and the inner surface of the casing 11.

The passage of fluid through the gaps around the ends of the paddle 26 is a necessary evil resulting from the fact that paddle 26 must be permitted to move freely with respect to the stationary parts such as the end plate 20 which does not move with the paddles. Thus, when the compensating disc completely covers the area between the paddle and the chamber wall on one side of the paddle, a given damping factor is established. When portions of the cross-sectional area on both sides of the paddle, that is, between the paddle and the chamber walls, are exposed to the opening 62 in the compensator disc 21, the fluid can now flow from one side of the paddle to the other over the top of the paddle, through the opening 62 in the disc 21. Thus, the damping is decreased but since this takes place at a lower temperature the viscosity of the damping fluid is increased with the result that the overall damping of the movement of the paddle in the chamber is constant. As the temperature decreases still further, the compensating disc 21 rotates clockwise exposing still larger portions of the cross-sectional area of the chamber on each side of the paddle 26, and thus as the temperature decreases a decreased amount of fluid damping is provided while on the other hand the viscosity of the damping fluid increases so that again the overall damping of the system is constant.

Figure 6:
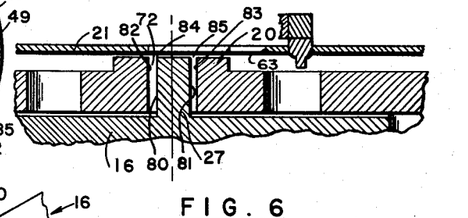
FIG. 6 is a partial section view taken along line 6—6 of FIG. 5.

FIG. 6 is a section view taken along 6—6 of FIG. 5 showing the gimbal 16 with paddle 27 in chamber 72 of the end plate 20, and the compensator plate 21 disposed above the chamber 72 and paddle 27.

Figure 7:
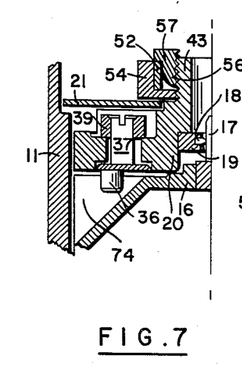
FIG. 7 is a partial section view taken along line 7—7 of FIG. 5.

In FIG. 7, which is a section taken along 7—7 of FIG. 5, there is shown the assembled relation between various components of the damping system. Gimbal stop 36 is shown positioned in the gimbal stop accommodating recess 74 in the gimbal 16. A similar stop is positioned in the other gimbal recess 75 (see FIG. 2).

Figure 8:
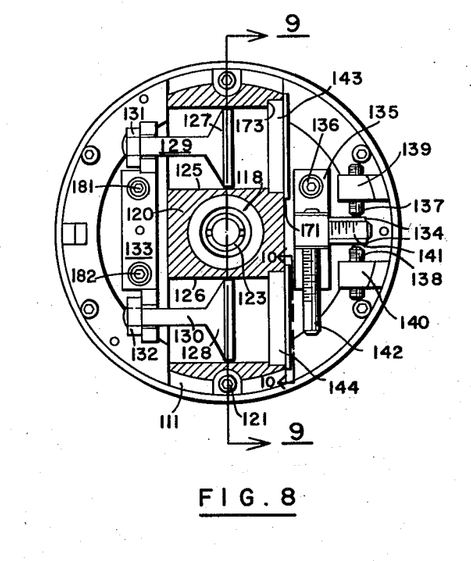
FIG. 8 is an end view partly in section of a cased rate gyro damping system illustrating another embodiment of this invention.
Figure 9:
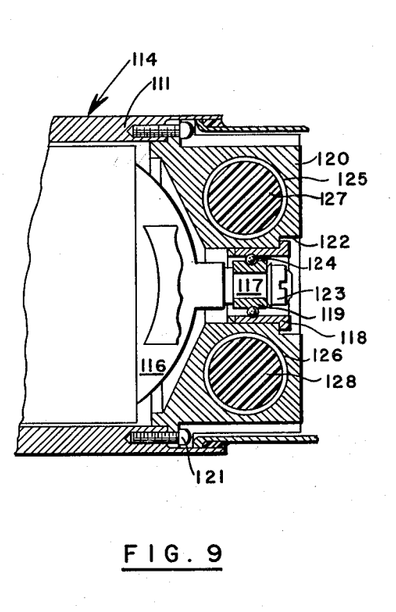
FIG. 9 is an axial section view of the end of the cased instrument shown in FIG. 8 taken along line 9—9.

FIGS. 8 through 14 show an alternate embodiment of this invention. In FIGS. 8 and 9 the rate gyro 114 has a casing 111. The gyro rotor is contained within gimbal 116. The latter is mounted for rotation about gimbal trunnion 117, having its axis common with the axis of gyro casing 111. End plate 120 is fastened onto casing 111 by a plurality of bolts 121. The end plate has an axial opening 122 which houses outer bearing sleeve 118. Inner bearing sleeve 119 is mounted on the gimbal trunnion 117 and is held in place by the ring-nut 123 which is in threaded engagement with gimbal trunnion 117. Ball bearings 124 provide for friction-minimizing rotation of the gimbal trunnion 117 relative to the fixed end plate 120. The end plate 120 contains cylindrical bores 125 and 126 within which pistons 127 and 128 are mounted for reciprocal motion. The pistons are mounted by means of connecting members 129 and 130, and nuts 131 and 132 onto the mounting bracket 133 which is attached to the gimbal 116 by bolts 181 and 182. Alternatively, the connecting members 129 and 130 can be fixedly mounted on the bracket 133 by equivalent means such as solder, welding, cement, etc. A stop arm 134 is attached to bracket 135 which in turn is secured to the gimbal by bolt means 136. The stop arm 134 permits but limited rotation of the gimbal 116 between limit stop set screws 137 and 138 in brackets 139 and 140 respectively, which are attached to the casing 111. The gimbal and attachments are adjusted for balance by means of screws 141 and 142.

Figures 10, 11, 12, 13, 14:
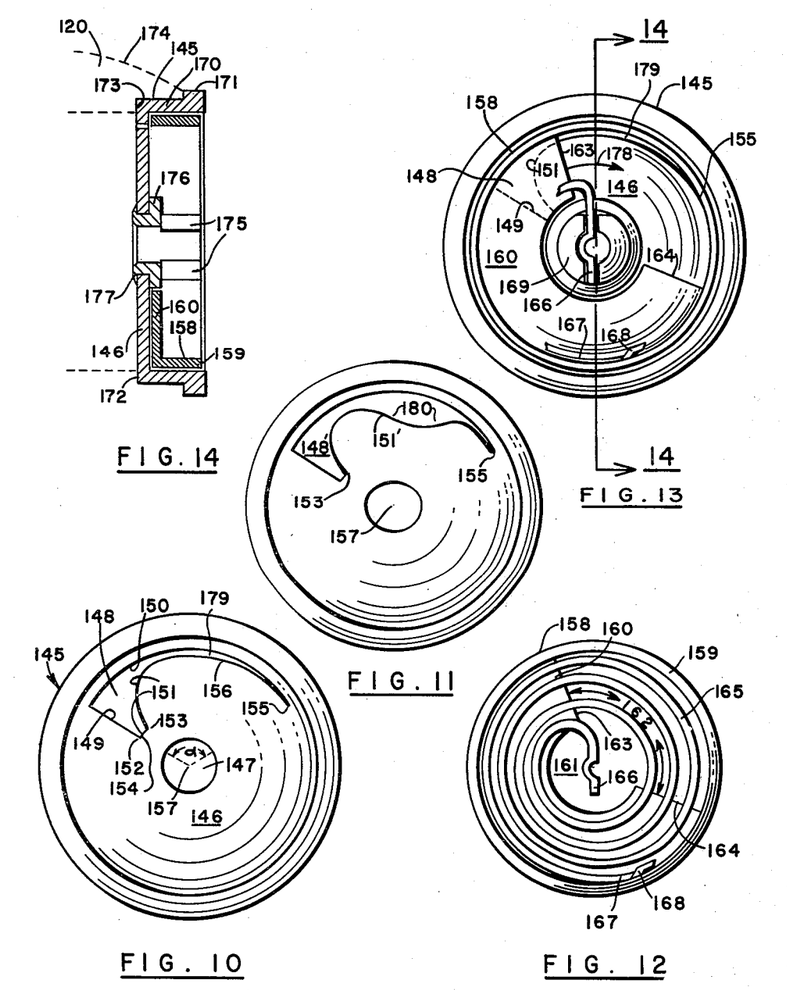
FIG. 10 shows another embodiment of the damping compensation member shown in FIG. 4.
FIG. 11 shows an end view of another embodiment of the damping compensation member.
FIG. 12 is an end view of a shutter member and temperature responsive member employed in the damping compensation valve assembly shown in the embodiment of FIGS. 8 and 9.
FIG. 13 is an end view of the combined components shown in FIGS. 10 and 12 with only parts of the temperature responsive member shown.
FIG. 14 is an axial section view taken along the line 14—14 of FIG. 13.

The fluid control valves 143 and 144 are located in the heads of the cylindrical bores on the side of the pistons opposite the connecting members 129 and 130. The structure of the damping compensation valves 143 and 144 are more clearly shown in FIGS. 10–14. In FIG. 10 is shown a view of a cup-shaped damping compensation member, as viewed along line 10—10 of FIG. 8. In the bottom member 146 of the cup-shaped member 145, is an axial opening 147 and a passage or opening 148 which approximates the area which the damping fluid viscosity temperature curve encloses between two predetermined points when shown in a polar coordinate graph. The elongated opening or passage 148 can be described as being enclosed by a peripheral boundary line having a first base section 149. As in the case of FIG. 4, line 149 can be described as one which is traced by a point moving along a portion of a radial line extending from the axis or center of the section 146, the line having both its terminals intermediate the axis and the outer peripheral edge of the bottom member 146. A second curved section 150 of the boundary originates at the end of the boundary section 149 which is nearer the peripheral edge of the bottom section, and is represented by a line traced by a point moving along a path having a fixed distance from the axis of rotation of the bottom member 146. A third boundary section 151 is represented by a line beginning at the other extremity of the straight line boundary section 149. At least a part of the third boundary section is a line traced by a second point moving along a path having a variable distance from the fixed axis of rotation of the bottom section 146. A first portion 154 of the third boundary section 151 between points 152 and 153 can be a straight line or a line traced by a point moving at a fixed radial distance from the axis of the end section 146. Alternatively, point 153 can coincide with point 152, eliminating boundary section 154. The boundary lines 150 and 151 of the opening 148 intersect at a point 155. Although in the figure, the angle formed by two lines drawn from the points 152 and 155 to intersect at the center 157 of the bottom section 146, is shown to be approximately 100°, the angle is not intended to be so limited. This angle can have any value up to a maximum of approximately 300° and depends on the use that is to be made of the damping valve. Although the portion 156 of the boundary section 151, between points 153 and 155, is shown to be a line traced by a moving point whose distance from the center point 157 of the bottom section 146 increases with angular displacement from the point 153, it is not intended that it be so limited. An alternate shape of the opening 148 is shown as 148′ in FIG. 11 wherein it is seen, for example, that the boundary section 151′ is represented by a line traced by a moving point whose distance from the center 157 both increases and decreases with increased angular displacement from the point 153. There can be a plurality of openings 148 in the damping compensation member shown in FIGS. 10 and 11, as shown in FIG. 4, for example.

The bottom section 146 can be of unitary construction with the sidewalls of the cup-shaped member 145, or, alternatively, the bottom section can be a composite structure. All that is necessary is that one or more openings of the type 148 or 148′ form passageways through the bottom section.

In FIG. 12 is shown a shutter member 158 which in this case is in the form of a cup-shaped structure having an annular wall 159 and a bottom or base section 160 having an axial opening 161 somewhat larger than the axial opening 147 in the bottom section 146 of the damping compensation member 145. In addition, a pie-shaped section 162 extending between radial boundary edges 163 and 164 is cut out or removed from the bottom section 160. The opening formed by the removal of the pie-shaped section 162 is sufficient to accommodate the passage 148 when the shutter member 158 is positioned inside the cup-shaped damping compensation member 145. The outside diameter of the shutter member is a little smaller than the inside diameter of the damping compensation member 145 to permit the positioning of the shutter member inside the compensation member. The bottom section 160 of the shutter member is positioned in rotational sliding contact with the bottom section 146. A temperature responsive member 165 is positioned inside the cup-shaped shutter member 158 adjacent the bottom section 160. The temperature responsive member 165 has a central end 166 and an outer end 167 which is fixedly connected to a bracket member 168 which in turn is fixedly mounted on the inside surface of the wall 159 of the shutter member. The end 167 is connected to the bracket member 168 by means well known in the art, such as soldering, welding, cementing, screws, etc.

The number and position of the openings in the bottom section 160 of the shutter member 158 correspond to the number and position of the passageways 148 in the compensation member 145.

In FIG. 13 is shown the shutter member 158 assembled inside the compensation member 145. Only the two ends of the temperature responsive member 165 are shown, however, in order to better illustrate the cooperation of the bottom section 160 of the shutter member with the bottom 146 of the cup-shaped compensation member 145. The end 166 of the temperature responsive member is fixedly mounted in the slot in the head of pin member 169 as by soldering, welding, cementing, etc.

FIG. 14 shows an axial section view taken along the line 14—14 of FIG. 13. In this view, it is seen that the annular wall 170 of the compensation member has an upper ledge 171. The bottom 172, of the compensation member 145 rests on shoulder 173 in the cylindrical bore 125 in end plate 120 (see FIG. 8). The section of the end plate 120 is indicated by means of dotted line 174 in FIG. 14.

A hollow pin 175 located axially of the compensation member 145, has a circumferential collar 176 intermediate its ends. The collar 176 has a diameter which is smaller than the diameter of the opening 161 in the shutter member 158. The pin 175 passes through opening 147 of the bottom section 146 of the compensation member 145, with the circumferential shoulder 176 resting radially adjacent the bottom section 146. The end of the pin 175 which extends through the section 146 is flanged, peened, or rolled over radially outward as shown at 177, in order to mount the pin securely and firmly in the bottom section 146. The temperature responsive member 165 is not shown in FIG. 14. However, as shown in FIG. 13 the end 166 of the temperature responsive member is fixedly mounted in the slotted head of pin member 175.

In operation, as the gimbal 116 undergoes limited angular rotation, one of the pistons 127, 128 moves away from the damping compensation valve, while the other moves toward the damping compensation valve. This causes damping fluid to be either drawn into or expelled from the cylindrical chamber between the piston and the damping compensation valve, depending on the direction of motion of the piston. The ease with which the fluid enters or leaves the cylindrical chamber depends on what part of the passage 148 in the damping compensation member 145 is coincident with the pie-shaped opening 162 in the shutter member 158. Referring to FIG. 13 the pin 175 which anchors one end of the temperature responsive member, is so mounted in the bottom section 146 that at a predetermined lower temperature, the temperature responsive member 165 serves to position the shutter member 160 in a manner such that the radial boundary edge 163 is positioned above the first base section line 149 of the peripheral boundary of passage 148. As the temperature increases, the expansion of the temperature responsive member 165 causes the shutter member 160 to rotate in the direction indicated by arrow 178 decreasing the fluid passage area until at a predetermined relatively higher temperature only the narrow section 179 of the passage 148 is coincident with the pie-shaped opening 162 in the shutter member 160, as shown in FIG. 13. This opening is further reduced by continued clockwise movement of the shutter member with increase in temperature. Hence, at a relatively higher temperature when the viscosity of the damping fluid is much lower, only a small fraction of the passageway 148 is open for passage of the fluid thus providing a degree of compensation. Alternatively, the degree of compensation can be varied with temperature by the use of a compensation member of the type shown in FIG. 11, whereby the degree of compensation at first increases rapidly with increasing temperature and then increases at a lower rate with further increase in temperature as the shutter member is rotated over the part of the passage 148′ that is bounded by section 180 of the boundary line 151′.

The curvature of the boundary 66 as shown in FIG. 4, and 151 as shown in FIGS. 10 and 14 is so plotted that the cross-sectional area of the passage through the compensation member available for the flow of damping fluid therethrough is substantially proportional to the area under the curve of a viscosity versus temperature plot for the damping fluid used, taken from the lowest temperature to the point of maximum temperature at which compensation is required. Small deviations can be made in the plotting of boundary lines 66 and 151 to compensate for inherent losses due to leakage of damping fluid through passageways inherent in the construction of the instrument.

Figure 15:
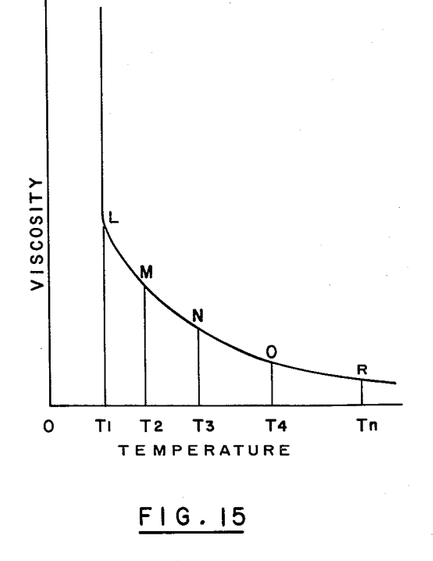
FIG. 15 is a graph showing a viscosity versus temperature curve of a representative damping fluid.
Figure 16:
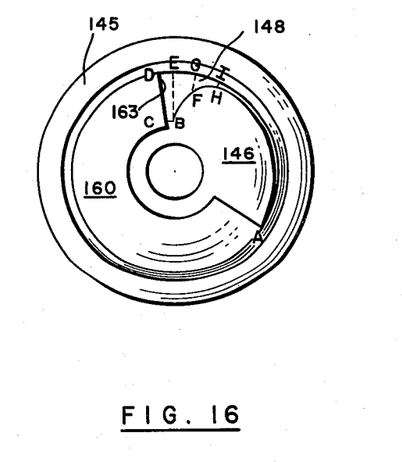
FIG. 16 is similar to the view of the shutter member and damping compensation member shown in FIG. 13 illustrating the different positions of the shutter member at different temperatures.

FIGS. 15 and 16 illustrate how the viscosity curve of a damping fluid is used in determining the shape of the passages 62, 63 and 148 in the compensation members 21 and 145. FIG. 15 is a representative viscosity versus temperature plot for a silicon damping fluid. $T_1$, $T_2$, $T_3$, $T_4$, and $T_n$ represent certain specific temperatures along the temperature coordinate. The letters L, M, N, O, and R on the viscosity curve indicate the viscosity of the fluid at the temperatures $T_1$, $T_2$, $T_3$, $T_4$, and $T_n$. If the lowest temperature at which the damping fluid is to operate is $T_1$, say, and the highest temperature is $T_n$, then the shutter member 160 and the temperature responsive member 165 (not shown in FIG. 16) are so mounted adjacent the bottom section 146 of the compensation member 145, that the edge 163 is aligned with boundary section line 149 (see FIG. 14 dotted line). In this position, the area $T_n$—$T_1$—L—R—$T_n$ when multiplied by a factor $k$, say, is equivalent to the area 148 bounded by the lines joining A, B, C, D, A. At temperature $T_2$ when the edge 163 of the shutter member 160 moves to a new position indicated by dotted B—E, the exposed area available for fluid passage, namely A—B—E—A, when multiplied by the proportionality factor $k$, is equivalent to the area under the curve represented by $T_n$—$T_2$—M—R—$T_n$, which is the new area at temperature $T_2$. When the edge 163 has moved to the position indicated by the dotted line F—G at temperature $T_3$, the area available for fluid passage through the compensation member 145 is indicated by area A—F—G—A and, when multiplied by the proportionality factor $k$, is equivalent to the area under the curve $$T_n-T_3-N-R-T_n$$

At $T_4$, when the edge 163 has moved to the position indicated by dotted line H—I, the area available for fluid passage indicated by A—H—I—A, when multiplied by $k$ is equivalent to the area under the curve represented by $T_n$—$T_4$—O—R—$T_n$. In like manner, the determination of the area available for fluid passage is made for different temperature in the case of the embodiment illustrated in FIGS. 2–7.

In the use of the damping compensation assembly illustrated in FIGS. 1–7 and also of the damping compensation assembly illustrated in FIGS. 8–14 in an operating rate gyroscope instrument over a temperature range of from about −65° F. to about 250° F. using a silicon damping fluid it is found that a substantially uniform damping is obtained over the stated temperature range as indicated by the substantially constant phase angle that is noted between the mechanical input rate to the gyroscope and the gyroscope response for a given frequency of mechanical input. A similar rate gyro instrument with a prior art damping mechanism showed a wide variation in the phase angle over the same temperature range at the same frequency of mechanical input.

The novel valves of this invention can be used to control the flow of any fluid. For damping applications, for example, the novel valves can be used with hydrocarbon oils having a viscosity of from about 5 to about 500 centistokes at 20° C. Fluids and fluid mixtures, such as silicone oils, for example, having viscosities of from about 1 to about 500 or more centistokes at 20° C. can also be used. A silicone oil having a viscosity of 20 centistokes at 20° C. is found to function satisfactorily in the rate gyroscope instrument described above to provide constant damping over a temperature range of from about −65° C. to about 250° C.

Another method of providing for a variation with temperature in the cross-sectional area available for fluid flow, is a combination of a fluid flow opening with a contour-shaped shutter member positioned adjacent the opening. The contour-shaped shutter member can be mounted for rotation on an axis parallel to the plane of the fluid flow opening. Rotation of the shutter can be actuated by a temperature responsive member in a manner such that a different portion of the contour-shaped surface of the shutter member is opposite the fluid flow opening at predetermined temperatures. Variation in fluid flow is obtained when a portion of the contour-shaped surface is at a distance from the opening which is less than the effective diameter of the opening. This provides for predetermined fluid flow which is a function of the contour of the contour-shaped surface, and hence provides a means for obtaining programmed fluid flow at predetermined temperatures. Alternatively, the above mentioned rotating shutter means with a contour-shaped surface, can be used to actuate a spring biased member capable of being positioned at variable fluid-flow restricting distances from the fluid flow opening. Thus the distance of the spring-biased member from the opening can be varied with temperature which in turn varies the effective cross-sectional area available for fluid flow and thus provides for programmed fluid flow as a function of temperature.

Although the invention has been illustrated and described in detail, the same is to be taken by way of illustration and example only and not by way of limitation, the spirit and scope of this invention being limited only by the appended claims.

I claim:

1. A valve orifice control mechanism comprising: (1) an orifice controlling first means containing at least one first passage; (2) an orifice controlling second means containing at least one second passage in communication through a third passage with the first passage of said first means; (3) a contoured means positioned in sliding relationship with said first and second means to selectively vary the orifice connecting said third passage with the said first and second passages; and (4) a thermal responsive means to selectively vary the alignment of portions of the said contoured means with the first and second passages of the said first and second means, with at least one of said first or second passages having an elongated cross-sectional area; wherein the cross-section of the orifice communicating with the third passage has a boundary which varies in a predetermined nonlinear fashion when the distance of displacement of said contoured means relative to the first and second means is substantially linear in response to the said thermal responsive means.

2. The mechanism of claim 1 wherein said contour means includes a plate having a cut-out section bounded by a first base section, a second boundary section, and third boundary section each extending from the opposite extremities of said first base section to a point of intersection which is removed from said first base section.

3. The mechanism of claim 1 wherein said contour means is rotatable about an axis and wherein said contour means includes a plate having a cut-out section bounded by a first base section, a second boundary section, and third boundary section each extending from the opposite extremities of said first base section to a point of intersection which is removed from said first base section.

4. The mechanism of claim 1 wherein said contour means is rotatable about an axis and wherein said contour means includes a plate having a cut-out section bounded by a first base section, and a second boundary section and third boundary section each extending from the opposite extremities of said first base section to a point of intersection which is removed from said first base section, wherein a two-dimensional representation of said second boundary section is a line traced by a first point moving along a path having a fixed distance from a fixed axis of rotation, and wherein a two-dimensional representation of at least a part of said third boundary section is a line traced by a second point moving along a path having a variable distance from said fixed axis of rotation.

5. The mechanism of claim 1 wherein said contour means is rotatable about an axis and wherein said contour means includes a plate having a cut-out section bounded by a first base section, and a second boundary section and third boundary section each extending from the opposite extremities of said first base section to a point of intersection which is removed from said first base section, wherein a two-dimensional representation of said second boundary section is a line traced by a first point moving along a path having a fixed distance from a fixed axis of rotation, and wherein a two-dimensional representation of at least a part of said third boundary section is a line traced by a second point moving along a path having a constantly increasing distance from said fixed axis of rotation as said second point travels over said part of said third boundary section in a direction away from said base section.

6. A damping control for a rotatable body comprising a casing; a fluid within the said casing to suspend the contained rotatable body; a plurality of chamber means within the casing radially disposed about the central axis of the said body; a plurality of vane means secured to said rotatable body and extending one each into the said chamber means with the abutment of the base of the said vane means forming two cavities therein; a contoured shutter member mounted concentrically and in spaced relationship adjacent the cavities, thereby providing a communication between the cavities within each of the said chamber means, the said shutter member having a plurality of contoured cut-out portions corresponding to the plurality of chamber means; a controllable actuating means associated with said shutter member to define a variable orifice by alignment of the said cut-out portions with the periphery of the said cavities for communication outside the said cavities; wherein the cross-sectional area of the orifice formed by the said cut-out portions and the said cavities varies in a predetermined manner in response to a given displacement of the said shutter member relative to the said chamber means.

7. The damping control of claim 6 wherein said contour means is rotatable about an axis and wherein said contour means includes a plate having a cut-out section bounded by a first base section, and a second boundary section and third boundary section each extending from the opposite extremities of said first base section to a point of intersection which is removed from said first base section, wherein a two-dimensional representation of said second boundary section is a line traced by a first point moving along a path having a fixed distance from a fixed axis of rotation, and wherein a two-dimensional representation of at least a part of said third boundary section is a line traced by a second point moving along a path having a constantly increasing distance from said fixed axis of rotation as said second point travels over said part of said third boundary section in a direction away from said base section.

8. A fluid damping control mechanism comprising a cylinder means, a piston means mounted for reciprocal motion within said cylinder means, an orifice control mechanism in the head of said piston means comprising: (1) an orifice controlling first means containing at least one first passage; (2) an orifice controlling second means containing at least one second passage in communication through a third passage with the first passage of said first means; (3) a contoured means positioned in sliding relationship with said first and second means to selectively vary the orifice connecting said third passage with the said first and second passages; and (4) a thermal responsive means to selectively vary the alignment of portions of the said contoured means with the first and second passages of the said first and second means, with at least one of said first or second passages having an elongated cross-sectional area; wherein the cross-section of the orifice communicating with the third passage has a boundary which varies in a predetermined nonlinear fashion when the distance of displacement of said contoured means relative to the first and second means is substantially linear in response to the said thermal responsive means.

9. The fluid damping control mechanism of claim 8 wherein said contour means is rotatable about an axis and wherein said contour means includes a plate having a cut-out section bounded by a first base section, and a second boundary section and third boundary section each extending from the opposite extremities of said first base section to a point of intersection which is removed from said first base section, wherein a two-dimensional representation of said second boundary section is a line traced by a first point moving along a path having a fixed distance from a fixed axis of rotation, and wherein a two-dimensional representation of at least a part of said third boundary section is a line traced by a second point moving along a path having a constantly increasing distance from said fixed axis of rotation as said second point travels over said part of said third boundary section in a direction away from said base section.

10. A valve orifice control mechanism comprising: (1) an orifice controlling first means containing at least one first passage; (2) an orifice controlling second means containing at least one second passage in communication through a third passage with the first pasage of said first means; (3) a contoured means positioned in sliding relationship with said first and second means to selectively vary the orifice connecting said third passage with the said first and second passages; and (4) a thermal responsive means to selectively vary the alignment of portions of the said contoured means with the first and second passages of the said first and second means; wherein the cross-section of the orifice communicating with the third passage has a boundary which varies in a predetermined nonlinear fashion when the distance of displacement of said contoured means relative to the first and second means is substantially linear in response to the said thermal responsive means.

11. A valve orifice control mechanism comprising, in combination, a first member containing a chamber, a second member mounted for relative rotation with respect to the said first member, and by means of secured protruding vane members thereon, forming a plurality of communicating cavities within the chamber of the said first member, a flow restricting member positioned adjacent the said plurality of cavities, said flow restricting member having a contoured surface and mounted for surface-position changing movement whereby predetermined portions of said contoured surface is positionable adjacent said cavities to vary the cross-sectional area for selective communication through the flow restricting member.

12. A valve orifice mechanism comprising, in combination, a first member containing a chamber, a second member mounted for relative rotation with respect to the said first member and by means of secured protruding vane members thereon forming a plurality of communicating cavities within the chamber of the said first member, a flow restricting member positioned adjacent the said plurality of cavities, an actuating member mounted in operative relationship with the said flow restricting member, whereby in response to given environmental conditions the cross-sectional area for communication through the said flow restricting member is controlled by the said actuating member.

13. A valve orifice control mechanism comprising a first plate member having at least one pair of radially disposed vane members protruding from one surface; a second plate member having at least one pair of radially disposed apertures; a third plate member having at least one pair of radially disposed cut-out portions extending from ends of the same diameter to an arc, a given distance from the center, and then along opposite sides of the diameter in arcuate trajectory of predetermined contour to the periphery; the first, second and third plate members mounted together for rotation relative to one another and so aligned that the vane members of the said first plate member are contained in apertures of the said second plate member; a resilient means connected between the said second and third plate members for restraint to relative rotation; wherein a parallel path of communication under control of a variable orifice connects with the existing paths of communication between the opposite sides of the said vane members within the said apertures.

References Cited in the file of this patent

UNITED STATES PATENTS 2,718,149   Bamford et al. _________ Sept. 20, 1955
2,995,940   Borg _________________ Aug. 15, 1961